United States Patent
Brown et al.

(10) Patent No.: US 9,519,089 B1
(45) Date of Patent: Dec. 13, 2016

(54) HIGH PERFORMANCE VOLUME PHASE GRATINGS

(71) Applicants: Robert D. Brown, Lake Oswego, OR (US); James H. Stanley, Palo Alto, CA (US)

(72) Inventors: Robert D. Brown, Lake Oswego, OR (US); James H. Stanley, Palo Alto, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 75 days.

(21) Appl. No.: 14/168,173

(22) Filed: Jan. 30, 2014

(51) Int. Cl.
*G02B 5/18* (2006.01)

(52) U.S. Cl.
CPC .............. *G02B 5/18* (2013.01); *G02B 5/1857* (2013.01)

(58) Field of Classification Search
CPC ... G02B 5/1866; G02B 5/1857; G02B 5/1814; G02B 5/18
USPC ........... 359/558–576; 428/172–173; 345/7–9
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |

(Continued)

FOREIGN PATENT DOCUMENTS

| | | |
|---|---|---|
| CN | 101881936 A | 11/2010 |
| DE | 1020060 03 785 | 7/2007 |

(Continued)

OTHER PUBLICATIONS

Cameron, A., The Application of Holographic Optical Waveguide Technology to Q-Sight Family of Helmet Mounted Displays, Proc. of SPIE, vol. 7326, 7326OH-1, 2009, 11 pages.

(Continued)

*Primary Examiner* — Scott J Sugarman
*Assistant Examiner* — Kristina Deherrera
(74) *Attorney, Agent, or Firm* — Donna P. Suchy; Daniel M. Barbieri

(57) ABSTRACT

Provided in one embodiment is an apparatus, comprising: an optical substrate configured to manipulate light received from a light source; and at least one diffractive element in one layer in the optical substrate, each diffractive element comprising: a plurality of sub-substrate structures separated from one another by a plurality of valleys, the sub-substrate structures comprising a material having a first refractive index; and a filler material filling at least partially at least some of the plurality of valleys, the filler material having a second refractive index that is unequal to the first refractive index.

15 Claims, 8 Drawing Sheets

(A)

(B)

(56) References Cited

U.S. PATENT DOCUMENTS

| | | |
|---|---|---|
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A * | 9/1992 | Nagano et al. ............... 349/201 |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 * | 9/2001 | Schultz ................ G02B 6/34 359/575 |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 * | 6/2004 | Dickson ............... G02B 5/1814 359/15 |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |

(56) References Cited

U.S. PATENT DOCUMENTS

| | | |
|---|---|---|
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 * | 9/2007 | Wang .............................. 359/569 |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |

(56) References Cited

U.S. PATENT DOCUMENTS

| | | |
|---|---|---|
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,938,141 B2 | 1/2015 | Magnusson |
| 2002/0021461 A1 | 2/2002 | Ono et al. |
| 2002/0131175 A1* | 9/2002 | Yagi et al. ............... 359/569 |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutehrland et al. |
| 2004/0188617 A1 | 9/2004 | Devitt et al. |
| 2004/0208446 A1 | 10/2004 | Bond et al. |
| 2004/0208466 A1* | 10/2004 | Mossberg et al. ............ 385/129 |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1* | 5/2006 | Miyakawa et al. ............ 428/172 |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |

(56) References Cited

U.S. PATENT DOCUMENTS

| | | | |
|---|---|---|---|
| 2011/0242349 | A1 | 10/2011 | Izuha et al. |
| 2011/0242661 | A1 | 10/2011 | Simmonds |
| 2011/0242670 | A1 | 10/2011 | Simmonds |
| 2012/0007979 | A1 | 1/2012 | Schneider et al. |
| 2012/0033306 | A1 | 2/2012 | Valera et al. |
| 2012/0044572 | A1 | 2/2012 | Simmonds et al. |
| 2012/0044573 | A1 | 2/2012 | Simmonds et al. |
| 2012/0062850 | A1 | 3/2012 | Travis |
| 2012/0099203 | A1 | 4/2012 | Boubis et al. |
| 2012/0105634 | A1 | 5/2012 | Meidan et al. |
| 2012/0120493 | A1 | 5/2012 | Simmonds et al. |
| 2012/0127577 | A1 | 5/2012 | Desserouer |
| 2012/0235900 | A1 | 9/2012 | Border et al. |
| 2012/0242661 | A1 | 9/2012 | Takagi et al. |
| 2012/0280956 | A1 | 11/2012 | Yamamoto et al. |
| 2012/0300311 | A1 | 11/2012 | Simmonds et al. |
| 2012/0320460 | A1 | 12/2012 | Levola |
| 2013/0069850 | A1 | 3/2013 | Mukawa et al. |
| 2013/0101253 | A1 | 4/2013 | Popovich et al. |
| 2013/0138275 | A1 | 5/2013 | Nauman et al. |
| 2013/0141937 | A1 | 6/2013 | Katsuta et al. |
| 2013/0170031 | A1 | 7/2013 | Bohn et al. |
| 2013/0200710 | A1 | 8/2013 | Robbins |
| 2013/0249895 | A1 | 9/2013 | Westerinen et al. |
| 2013/0257848 | A1 | 10/2013 | Westerinen et al. |
| 2013/0258701 | A1 | 10/2013 | Westerinen et al. |
| 2013/0314793 | A1 | 11/2013 | Robbins et al. |
| 2013/0322810 | A1 | 12/2013 | Robbins |
| 2013/0328948 | A1 | 12/2013 | Kunkel et al. |
| 2014/0104665 | A1 | 4/2014 | Popovich et al. |
| 2014/0104685 | A1 | 4/2014 | Bohn et al. |
| 2014/0140653 | A1 | 5/2014 | Brown et al. |
| 2014/0140654 | A1 | 5/2014 | Brown et al. |
| 2014/0146394 | A1 | 5/2014 | Tout et al. |
| 2014/0152778 | A1 | 6/2014 | Ihlenburg et al. |
| 2014/0168055 | A1 | 6/2014 | Smith |
| 2014/0168260 | A1 | 6/2014 | O'Brien et al. |
| 2014/0168735 | A1 | 6/2014 | Yuan et al. |
| 2014/0172296 | A1 | 6/2014 | Shtukater |
| 2014/0176528 | A1 | 6/2014 | Robbins |
| 2014/0204455 | A1 | 7/2014 | Popovich et al. |
| 2014/0211322 | A1 | 7/2014 | Bohn et al. |
| 2014/0218801 | A1 | 8/2014 | Simmonds et al. |
| 2015/0010265 | A1 | 1/2015 | Popovich et al. |
| 2015/0289762 | A1 | 10/2015 | Popovich et al. |

FOREIGN PATENT DOCUMENTS

| | | |
|---|---|---|
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 | 11/2007 |
| WO | WO-2007/130130 A2 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Non-Final Office Action on U.S. Appl. No. 13/869,866 Dated May 28, 2014, 16 pages.
Wisely, P.L., Head up and head mounted display performance improvements through advanced techniques in the manipulation of light, Proc. of SPIE vol. 7327, 732706-1, 2009, 10 pages.
U.S. Appl. No. 61/796,795, filed Nov. 20, 2012.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Extended European Search Report for EP Application No. 13192383, dated Apr. 2, 2014, 7 pages.
International Preliminary Report on Patentability for PCT Application No. PCT/US2013/038070, dated Oct. 28, 2014, 6 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
U.S. Appl. No. 10/555,661, filed Nov. 4, 2005, Popovich et al.
U.S. Appl. No. 13/844,456, filed Mar. 15, 2013, Brown et al.
U.S. Appl. No. 61/344,748, filed Sep. 28, 2010.
U.S. Appl. No. 61/457,835, filed Jun. 16, 2011.
U.S. Appl. No. 61/573,066, filed Aug. 24, 2012.
U.S. Appl. No. 61/573,082, filed Aug. 29, 2011.
U.S. Appl. No. 61/573,121, filed Sep. 7, 2011.
U.S. Appl. No. 61/573,156, filed Sep. 16, 2011.
U.S. Appl. No. 61/573,175, filed Sep. 19, 2011.
U.S. Appl. No. 61/573,176, filed Sep. 19, 2011.
U.S. Appl. No. 61/573,196, filed Sep. 25, 2011.
U.S. Appl. No. 61/627,202, filed Oct. 7, 2011.
U.S. Appl. No. 61/687,436, filed Apr. 25, 2012.
U.S. Appl. No. 61/689,907, filed Apr. 25, 2012.
U.S. Appl. No. 61/850,856, filed Feb. 25, 2013.
International Search Report and Written Opinion regarding PCT/US2013/038070, mail date Aug. 14, 2013, 14 pages.
Office Action for U.S. Appl. No. 13/250,621, mail date May 21, 2013, 10 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Ayras et al., Exit Pupil Expander with a Large Field of View Based

(56) References Cited

OTHER PUBLICATIONS on Diffractive Optics, Journal of the SID, 2009, 6 pages.
Crawford, "Switchable Bragg Gratings", Optics & Photonics News, Apr. 2003, pp. 54-59.
Final Office Action in U.S. Appl. No. 13/864,991, dated Apr. 2, 2015, 16 pages.
Final Office Action on U.S. Appl. No. 13/250,858 Dated Feb. 4, 2015, 18 pages.
Final Office Action on U.S. Appl. No. 13/250,940 Dated Oct. 17, 2014, 15 pages.
Final Office Action on U.S. Appl. No. 13/892,026 Dated Apr. 3, 2015, 17 pages.
Final Office Action on U.S. Appl. No. 13/892,057 Dated Mar. 5, 2015, 21 pages.
Frist office action received in Chinese patent application No. 201380001530.1, dated Jun. 30, 2015, 9 pages with English translation.
Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/250,858 dated Jun. 12, 2015, 20 pages.
Non-Final Office Action on U.S. Appl. No. 13/250,858 Dated Sep. 15, 2014, 16 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, XX Pages.
Non-Final Office Action on U.S. Appl. No. 13/864,991 Dated Oct. 22, 2014, 16 pages.
Non-Final Office Action on U.S. Appl. No. 14/038,400 Dated Feb. 5, 2015, 18 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Notice of Allowance for U.S. Appl. No. 12/700,557, mail date Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Office Action for U.S. Appl. No. 12/700,557, mail date Aug. 9, 2013, 12 pages.
Office Action for U.S. Appl. No. 12/700,557, mail date Feb. 4, 2013, 11 pages.
Office Action for U.S. Appl. No. 13/250,858 Dated Feb. 19, 2014, 13 page.
Office Action for U.S. Appl. No. 13/250,858, mail date Oct. 28, 2013, 9 pages.
Office Action for U.S. Appl. No. 13/250,940, mail date Aug. 28, 2013, 10 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Office Action on U.S. Appl. No. 13/892,026 Dated Dec. 8, 2014, 19 pages.
Office Action on U.S. Appl. No. 13/892,057 Dated Nov. 28, 2014, 17 pages.
Plastic has replaced glass in photochromic lens, www.plastemart.com, 2003, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Webster's Third New International Dictionary 433 (1986), 3 pages.
Final Office Action on U.S. Appl. 13/869,866 Dated Oct. 3, 2014, 17 pages.
Final Office Action on U.S. Appl. No. 14/038,400 Dated Aug. 10, 2015, 32 pages.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 Dated Jul. 14, 2015, 32 pages.
Notice of Allowance on U.S. Appl. No. 13/355,360 Dated Apr. 10, 2014, 7 pages.
Restriction Requirement for U.S. Appl. No. 12/700,557, mail date Oct. 17, 2012, 5 pages.
Second office action received in Chinese patent application No. 201380001530.1, dated Oct. 12, 2015, 5 pages with English translation.
Extended European Search Report for European Application No. 13765610.4 dated Feb. 16, 2016, 6 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
Non-Final Office Action on U.S. Appl. No. 13/250,858, dated Mar. 18, 2016, 20 pages.
Notice of Allowance for U.S. Appl. No. 14/109,551, dated Nov. 20, 2015, 8 pages.
Notice of Allowance on U.S. Appl. No. 13/432,662, dated Feb. 18, 2016, 10 pages.

\* cited by examiner

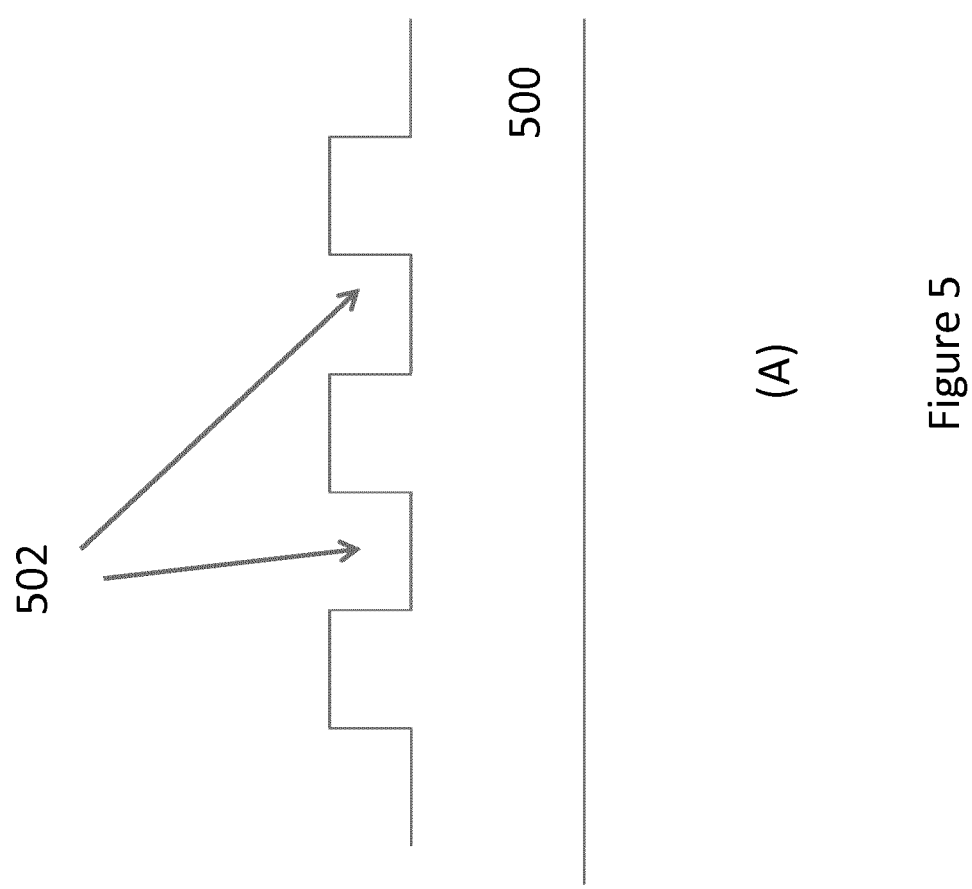

(A)

(B)

HIGH PERFORMANCE VOLUME PHASE GRATINGS

BACKGROUND

The optical design benefits of diffractive optical elements (DOEs) include unique and efficient form factors and the ability to encode complex optical functions, such as optical power and diffusion into thin layers. Bragg gratings (also commonly termed volume phase gratings or holograms), which offer high diffraction efficiencies, have been used in devices such as Head Up Displays (HUDs) and Helm Mounted Displays (HMDs). An important class of Bragg gratings devices is known as a Switchable Bragg Gratings (SBG). An SBG is a diffractive device formed by recording a volume phase grating, or hologram, in a polymer dispersed liquid crystal (PDLC) mixture, or holographic polymer-dispersed liquid crystals (HPDLC) mixture.

One attribute of HPDLC is that the phase separation produces high modulation of the refractive index in a layer of material, which in turn enables wide fields of view and high optical efficiencies. Liquid crystals have high refractive index differences along their different molecular cross sections; thus by aligning the molecules correctly with respect to the gratings planes, an efficient and broadband hologram may be attained. However, HPDLC material is susceptible to haze. HPDLC undergoes a "phase separation" during recording of the holograms in which the liquid crystal molecules get squeezed out of the polymer matrix to form microdroplets. While these microdroplets are desirable in that they provide the desired modulation of phase, if the microdroplets are not small enough or not uniform enough haze may easily form. Haze creates haloes around HUD symbology, adding to the overall "green glow" of the display.

SUMMARY

In view of the foregoing, the Inventors have recognized and appreciated the advantages of an article or apparatus that has the beneficial functional properties of a high bandwidth volume phase hologram (e.g., HPDLC) without its drawbacks and a method of making same.

Accordingly, provided in one embodiment is an apparatus, comprising: an optical substrate configured to manipulate light received from a light source; and at least one diffractive element in one layer in the optical substrate. Each diffractive element comprises: a plurality of sub-substrate structures separated from one another by a plurality of valleys, the sub-substrate structures comprising a material having a first refractive index; and a filler material filling at least partially at least some of the plurality of valleys, the filler material having a second refractive index that is unequal to the first refractive index.

Provided in another embodiment is a method of making a diffractive element, comprising: disposing a photoresist over a first portion of a substrate, the substrate comprising a material having a first refractive index; developing the photoresist into a grating mask by recording an interference pattern of two coherent beams into the photoresist; etching a second portion of the substrate not covered by the gratings mask to create at least one valley in the substrate; filling at least partially the at least one valley with a filler material having a second refractive index that is unequal to the first refractive index; and removing the gratings mask from the substrate, thereby forming the diffractive element in one layer of an optical substrate.

Provided in another embodiment is an apparatus, comprising: an optical substrate configured to manipulate light received from a light source; and at least one diffractive element in one layer in the optical substrate. Each diffractive element comprises: a plurality of sub-substrate structures separated from one another by a plurality of valleys, the sub-substrate structures comprising a material having a first refractive index; and a filler material filling at least partially at least some of the plurality of valleys, the filler material having a second refractive index that is unequal to the first refractive index. The at least one diffractive element does not comprise a holographic polymer dispersed liquid crystal.

Provided in another embodiment is a method of making a diffractive element, the method comprising: forming a sub-substrate structure into a substrate comprising a material having a first refractive index; and filling at least partially at least one valley created as a result of the forming with a filler material having a second refractive index that is unequal to the first refractive index; thereby forming the diffractive element in one layer of an optical substrate. The forming may involve at least one of stamping, molding, and casting.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, an inventive article that has the beneficial functional properties of a high bandwidth volume phase hologram (e.g., HPDLC) without its drawbacks and a method of making same. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
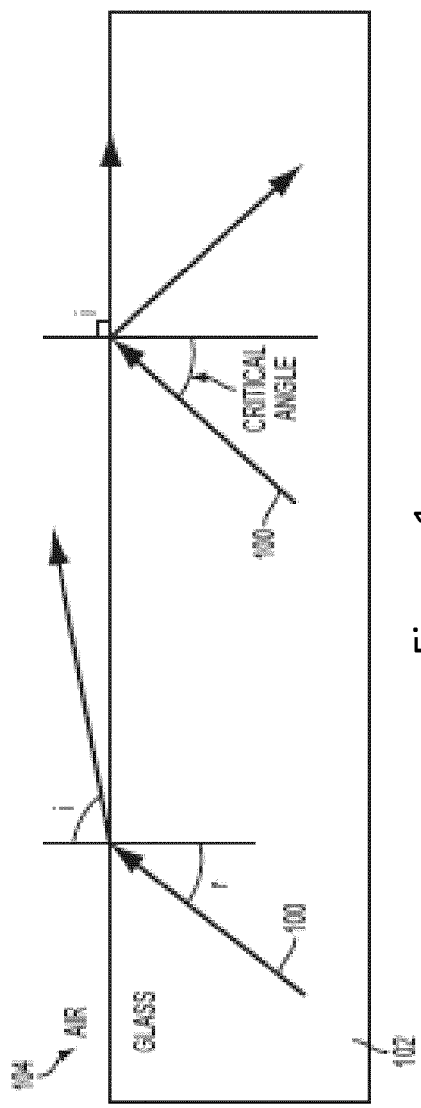
FIG. 1 is a diagram showing light passing through glass and air, in one exemplary embodiment.

Referring to FIG. 1, a light wave 100 may pass through a glass or plastic layer 102 and an air layer 104, according to an exemplary embodiment. The refractive index of glass/plastic 102 may be found using Snell's equation: Sine i/Sine r=refractive index. The largest angle of incidence in which light wave is refracted out of glass/plastic 102 is called the critical angle ($r_c$). In air, when i=90°, Sine $r_c$=1/refractive index, so for propagation in a waveguide (parallel surfaces of optical medium) the allowable angle range is $r_c$ to r=90°.

Figure 2:
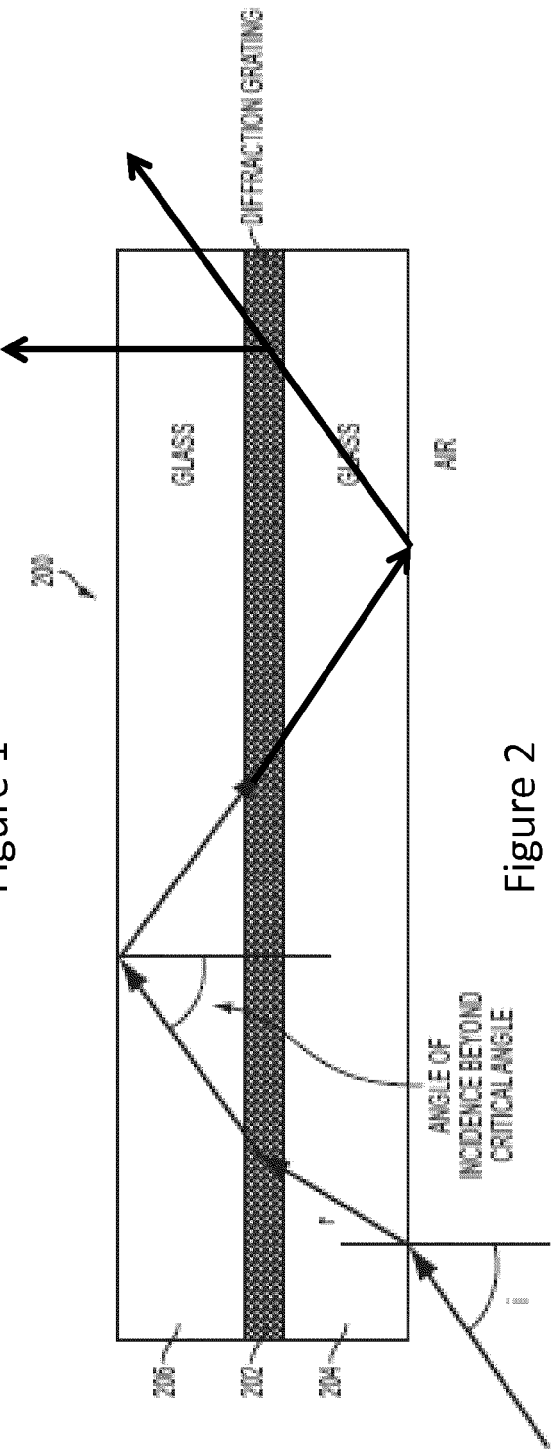
FIG. 2 is a diagram showing light passing through glass and a diffraction coupling, in one exemplary embodiment.

Referring to FIG. 2, light enters a substrate or waveguide 200 and is diffracted by a diffractive element (or diffraction grating) 202 between a glass layer 204 and another glass layer 206. Diffraction gratings 202 adjusts the angle of the light passing through glass 204 so that the angle of the light as it meets the upper surface of glass 206 is beyond the critical angle and it reflects internally in waveguide 200. This light ray will then pass back through gratings 202 and glass layer 204 and exit into the air at a different point than it entered glass layer 204. The diffractive element 202 may be a switchable diffractive element. The diffractive element 202 may alternatively be a non-switchable diffractive element. According to various exemplary embodiments, diffractive element 202 may be any of the diffractive elements described herein. For example, the diffractive element may comprise a volume phase grating.

Figure 3:
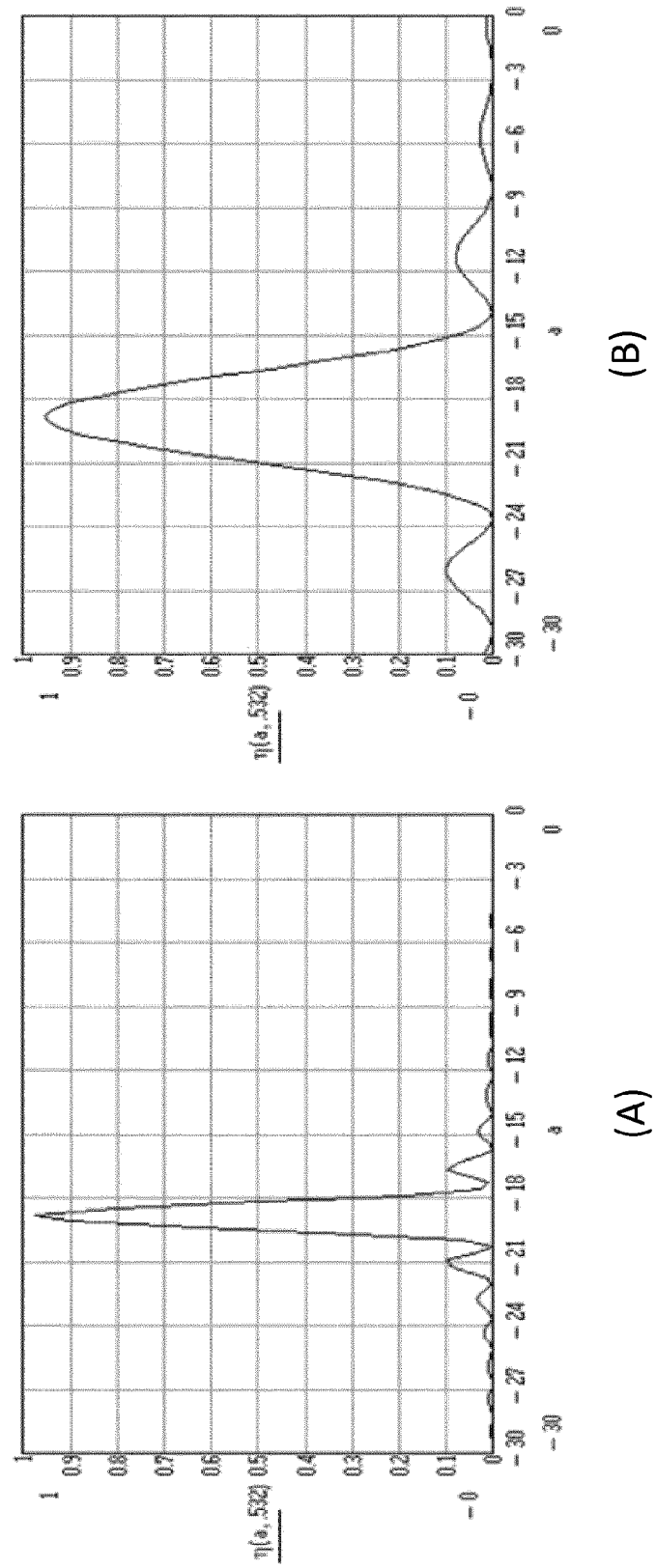
FIGS. 3A-3B show efficiency vs. field of view for volume phase holograms in one exemplary embodiment: (A) shows a photopolymer hologram with index modulation of 0.02, thickness of 10 microns; and (B) shows HPDLC hologram with index modulation of 0.063, thickness of 3 microns.

Holograms may be made by interfering two coherent optical waves inside a photosensitive medium, such as sensitized gelatin or one of a wide range of photopolymers. The photosensitive medium may record the amplitude of the interference pattern such that it manifests as either an amplitude or phase modulating diffraction grating. These holograms may be referred to as volume phase gratings or volume phase holograms ("VPH"). However, photopolymers without liquid crystal molecules may be limited to low refractive index modulation, resulting in low optical efficiency, or in the case of thick films, narrow angular bandwidth (small field of view). Referring to FIG. 3A and FIG. 3B, a photopolymer hologram with index modulation of 0.02 and thickness of 10 microns and a HPDLC hologram with index modulation of 0.063 and a thickness of 3 microns, respectively, in one embodiment of pre-existing configuration are illustrated.

Kogelnik theory shows that the thinner the VPH the wider the angular bandwidth, but higher refractive index modulation is needed to achieve the same efficiency. Thus, it may be desirable to obtain materials capable of refractive index modulation value of 0.5 so that the thickness could be reduced to sub-micron values, resulting in wide angular bandwidths. In at least one embodiment, the index modulation value may be related to the difference between the refractive index of the optical substrate material and that of the filler material. For example, in accordance with Kogelnik, the index modulation between a first material and a second material may be determined by (n1−n2)/2, wherein n1 and n2 are refractive indices of the first and second materials, respectively. Different combinations of substrate and filler materials with various respective refractive indices may be employed to tailor the index modulation value of the apparatus described herein. For example, filler materials may have refractive indices of as much as 2.2, or they may be a birefringent material, such as liquid crystal with one refractive index matched to the substrate and the other much higher. In one embodiment, the diffractive element becomes switchable when the filler material comprises a liquid crystal.

The diffractive elements described herein may have an index modulation value that is at least about 0.05—e.g., at least about 0.1, at least about 0.15, at least about 0.2, at least about 0.25, at least about 0.3, at least about 0.35, at least about 0.4, at least about 0.45, at least about 0.46, at least about 0.47, at least about 0.48, at least about 0.49, at least about 0.5, at least about 1.0, or higher. In one embodiment, the diffractive elements described herein may have an index modulation value that is between about 0.05 and about 0.5—e.g., between about 0.08 and about 0.49; between about 0.1 and about 0.48; between about 0.15 and about 0.45; between about 0.2 and about 0.42; between about 0.25 and about 0.4; between about 0.3 and about 0.35, etc. Other values higher or lower than the aforementioned values are also possible.

Figure 4:
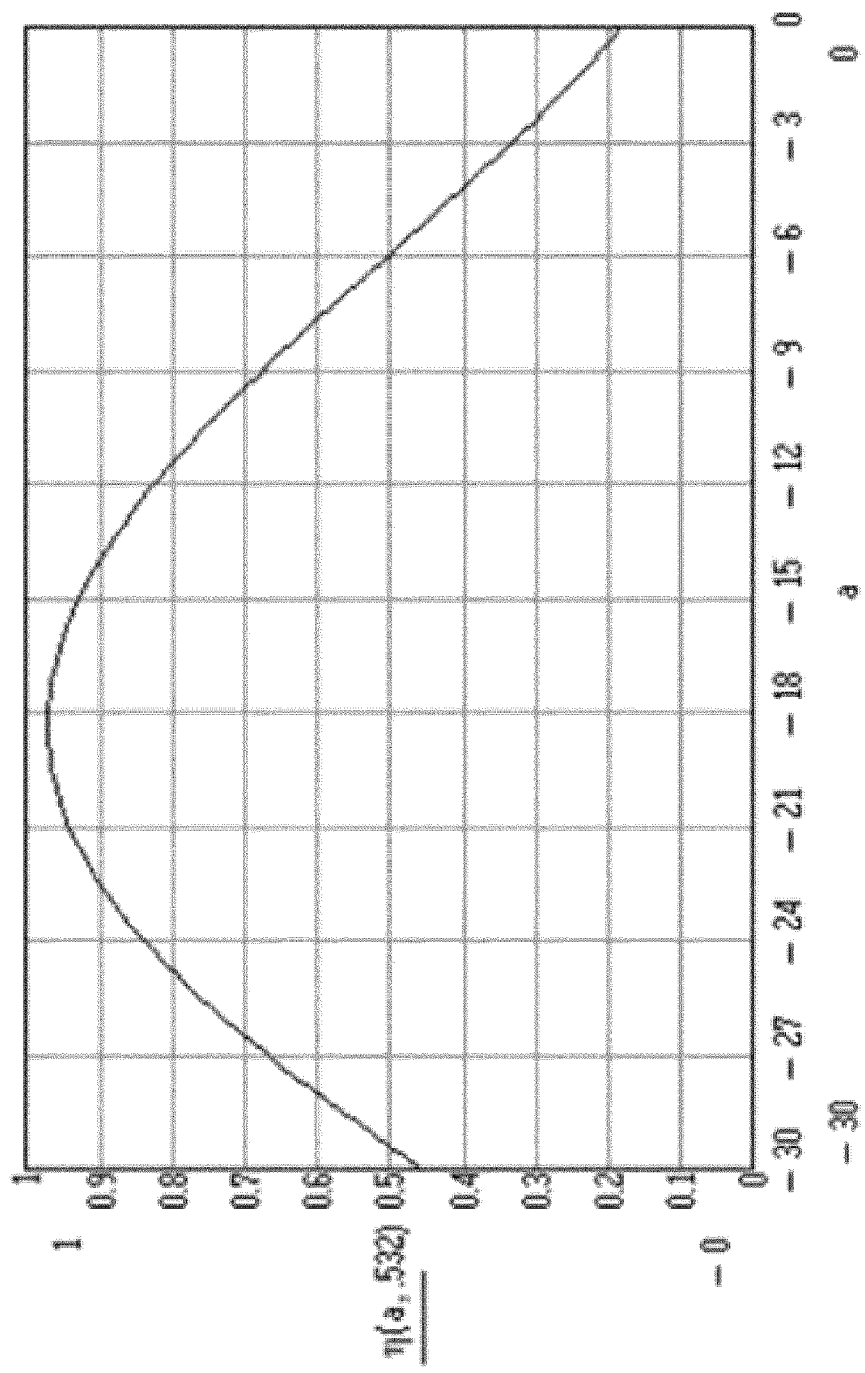
FIG. 4 shows efficiency vs. field of view for a hologram with index modulation of 0.49 and thickness of 0.5 microns, in one exemplary embodiment.

FIG. 4 shows a graph of efficiency vs. field of view generated by a computer simulation software, representing a material which may produce a single grating capable of addressing the full field of view of a typical HUD, thereby simplifying the design (and reducing the cost) of current waveguide based HUDs.

Provided in one embodiment is an apparatus herein, the apparatus comprising: an optical substrate configured to manipulate light received from a light source; and at least one diffractive element in one layer in the optical substrate. Each diffractive element may comprise: a plurality of sub-substrate structures separated from one another by a plurality of valleys, the sub-substrate structures comprising a material having a first refractive index; and a filler material filling at least partially at least some of the plurality of valleys, the filler material having a second refractive index that is unequal to the first refractive index. The manipulation of light referred to herein may include, but need not be, propagation of light. For example, in one embodiment wherein the optical substrate is a part of a waveguide, the manipulation of light may include the propagation of light.

One of the apparatuses described herein may further comprise a first set of at least one of the at least one diffractive elements in the optical substrate; and a second set of at least one of the at least one diffractive elements in the optical substrate. Each diffractive element in the second set may correspond to a diffractive element in the first set. In one embodiment, each of the first set of at least one of the at least one diffractive elements is further configured to diffract the light at an angle for propagation in the optical substrate. In another embodiment, each of the second set of diffractive elements is further configured to diffract the light for display.

The apparatuses described herein may comprise diffraction gratings implemented similarly to surface relief structures. In one embodiment, these structures are etched into transparent inorganic materials (such as glass, or high refractive index oxide layers evaporated onto glass). The gratings are etched into the material, as shown in the schematic of FIG. 5A. FIGS. 5A and 5B illustrate the configuration of a pre-existing surface grating.

Referring to FIG. 5A, a substrate 500 etched with valleys with rectangular cross sections 502 about 0.15 microns deep in one embodiment of a pre-existing surface grating may be employed. Since the gratings are thin, they may have a wide angular bandwidth, In this embodiment, the refractive index modulation is effectively 0.26 and the resulting efficiency is low, only about 10%. FIG. 5B shows the efficiency behavior of this surface grating in one embodiment.

Referring to FIG. 6A, the valleys with rectangular cross-sections that are about 0.5 microns deep into substrate 604 and overcoated with a high refractive index coating 603 in one embodiment may be employed to create a volume phase grating. The depth of the valleys in the diffractive elements described herein may be larger than that in the pre-existing surface gratings. Since the gratings are thin, they may have a wide angular bandwidth. In this embodiment, the refractive index modulation is effectively 0.5, and the resulting efficiency is high, >90%. FIG. 6B shows the efficiency behavior of this volume phase grating in one embodiment. Other index modulation values may be obtained. Other depth values may be employed.

At least some of the valleys 602 may be filled at least partially with a filler material 603. The valleys may be created by etching a certain portion of a substrate 604, resulting in a plurality of sub-substrate structures 605—the process of etching is described further below. The sub-substrate structure may be periodic, separately by a plurality of valleys of different sizes (e.g., width) as shown in FIG. 6A, or it may comprise a plurality of structures separated by a plurality of valleys of different sizes.

The sub-substrate structures need not be positioned perpendicularly to the surface of the optical substrate. Some, or all, of these sub-substrate structures may be positioned at an angle deviating from the normal of the optical substrate, as shown in, for example, FIG. 6A. The angles deviating from the normal may be of any suitable values, depending on the application. For example, the sub-substrate structures may be posited at an angle ranging from being parallel to the substrate to perpendicular to the substrate. In other words, the angle deviating from the normal may be any value between 0 degrees and 90 degrees.

These slanted sub-substrate structures may be created as a result of etching the valleys into the substrate at an angle. These sub-substrate structures may be slanted at the same angle or different angles. In one embodiment, the angles may vary along a top surface of the optical substrate. In one embodiment, as a result, the diffractive element may have a non-zero k-vector that varies along the respective direction of light propagation, as shown in FIG. 6A. The diffractive elements (and the apparatuses comprising same) described herein may be employed at the input and/or output gratings in the case of an optical display. For example, such employment of the diffractive elements herein may allow pupil expansion, particularly when the diffractive elements described herein are employed in the output grating.

The sub-substrate structure 605 may comprise the same material as the substrate 604 or they may comprise different materials. In one embodiment, the sub-substrate structure 605 may comprise an inorganic material, such as a glass, a metal oxide, and the like. In another embodiment, the sub-substrate material may comprise an organic material, such as an optical plastic, an adhesive, and the like.

The sub-substrate or substrate may comprise at least one of a glass, a plastic, and a metal oxide. Other suitable materials, such as any transparent inorganic materials, may also be used, depending on the application. The glass may comprise, or be, for example, N-Bk7, N-F2, or the like. The plastic may comprise, or be, for example, acrylic, polycarbonate, or the like. The metal oxide may comprise, or be, for example, titania, ceria, or the like. In one embodiment, the metal oxide may comprise a high refractive index oxide evaporated onto a glass.

In one embodiment, at least some of the valleys are filled completely with a filler material 603. In one embodiment, all of the valleys are filled completely with a filler material 603. While all of the valleys may be filled to the same extent by the filler material, in some embodiments the valleys 602 are filled to different extents by the filler material. The valleys may also be over-filled so that the filler material forms an overcoat over at least some of the sub-substrate structures. In another embodiment, the valleys are overfilled with the filler material 603 that the filler material becomes effectively an overcoat of all of the sub-substrate structures, as shown in FIG. 6A.

The valleys may have any desirable depth, depending on the application. In some embodiments, the depth of the valleys described herein may be larger than those in pre-existing surface gratings. The depth may be defined as the distance between the top 604 and bottom 605 of the diffractive structure 601. In one embodiment, the depth may be less than or equal to about 2 microns—e.g., less than or equal to about 1 micron, about 0.5 microns, about 0.4 microns, about 0.3 microns, about 0.2 microns, about 0.1 microns, or smaller. While all of the valleys may have the same depth, they do not need to have the same depth. In one embodiment, the valleys have the same depths across the optical substrate. In another embodiment, the valleys do not have the same depth across the optical substrate. The depth may be predetermined to suit the application and material chemistry. The determination process may be carried out using software, such as a simulation software and/or an optimization software. The software may also be customized and recorded as an algorithm of instruction on a non-transitory computer readable medium to be executed by at least one processor.

Each of the valleys may contain at least one filler material. The different valleys may have the same or different filler materials. The filler material may comprise any suitable material, depending on the application and the material chemistry. The filler material may comprise an inorganic material. The filler material may consist essentially of an inorganic material. The filler material may consist of an inorganic material. In one embodiment, the filler material may have a high refractive index, particularly relatively to the material of the sub-substrate structure. The refractive index of the filler material may be unequal to that of the sub-substrate and/or substrate material. In one embodiment, the refractive index of the filler material is higher than that of the sub-substrate and/or substrate material. One example of this embodiment provides the sub-substrate structures comprising a glass and the filler material having a higher refractive index than the glass, such as a metal oxide (e.g., titania). In another embodiment, the refractive index of the filler material is lower than that of the sub-substrate and/or substrate material. One example of this embodiment provides the sub-substrate structures comprising titania and the filler material having a lower refractive index than the glass, such as a polymer.

The filler material 603 may comprise a metal oxide, such as an oxide of titanium or an oxide of cerium. The filler material may alternatively comprise a homogenous liquid crystal fluid. The filler material may consist essentially of a homogenous liquid crystal fluid. The filler material may consist of a homogenous liquid crystal fluid. In one embodiment, using liquid crystal as the filler material may enable the diffractive element to become switchable. The filler may alternatively comprise an optical adhesive. The filler material may alternatively comprise an optical plastic.

In one embodiment, the diffractive element does not comprise any dispersed material, such as a holographic polymer dispersed liquid crystal (HPDLC). In one embodiment, the diffractive element comprises a plurality of sub-substrate structures separated from one another by a plurality of valleys, and each of the sub-substrate structures comprises an inorganic material. In another embodiment, the sub-substrate structures comprise an organic material, such as a plastic.

An apparatus containing the aforedescribed diffractive elements may be employed in a variety of applications. Because of the suitability to be employed in an optical display, the apparatuses described herein may be a part of a device that is a part of at least one of HMD, HUD, and HDD. The apparatuses described herein need not be in an optical display. The apparatuses described herein also need not be a part of a waveguide. For example, the apparatus may be a part of a device that is employed to propagate any suitable waves. The device may be, for example a satellite.

Figure 7:
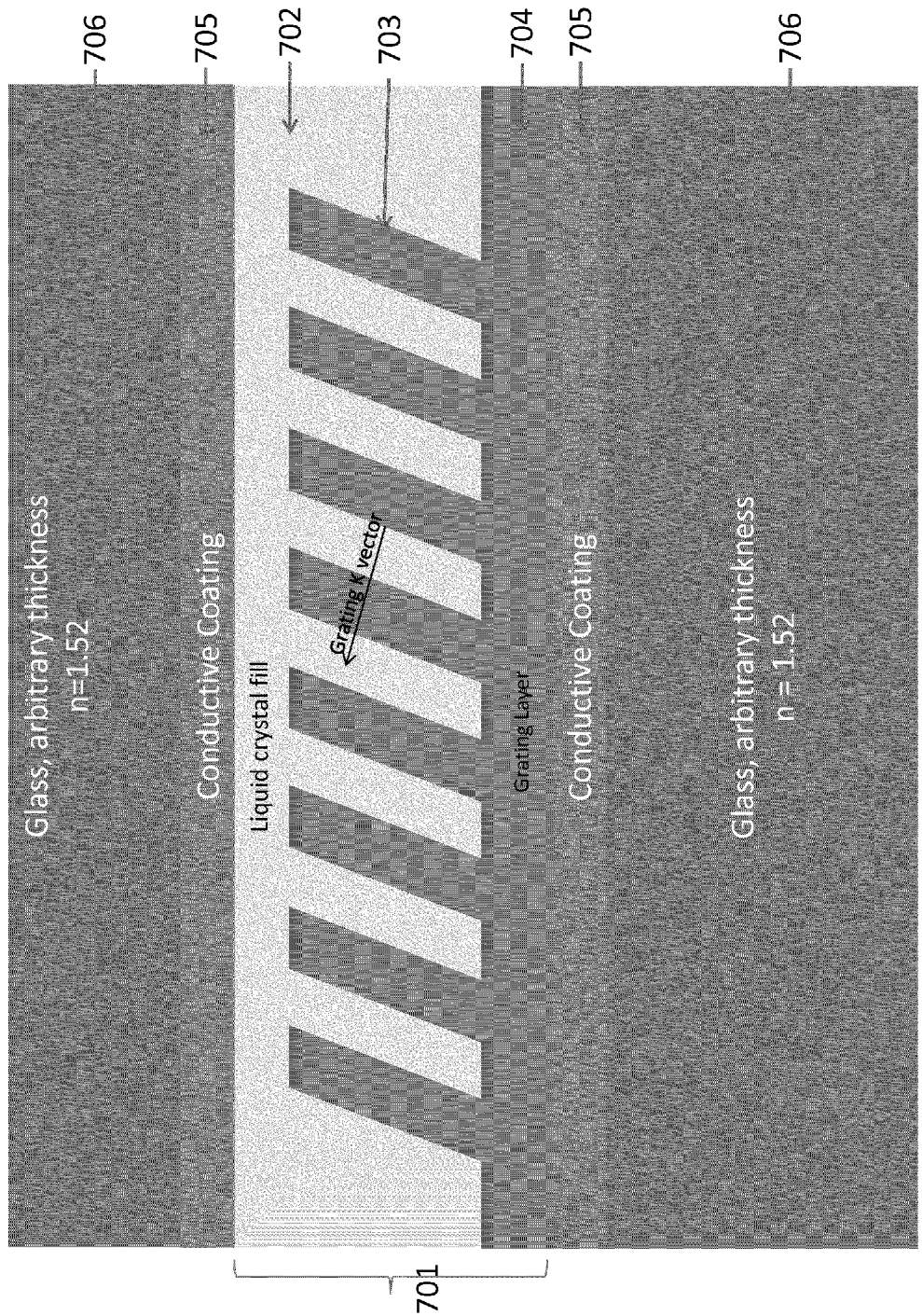
FIG. 7 illustrates a grating containing a liquid crystal as the filler material in one exemplary embodiment.

FIG. 7 illustrates an alternative embodiment of a diffractive embodiment 701, in which the filler material 702 comprises a liquid crystal. In this embodiment, the sub-substrate structures 703 over a grating layer substrate 704 are illustrated. The diffractive element 701 may be sandwiched between two conductive coatings 705. The two conductive coatings 705 may comprise the same material or may comprise different materials. The conductive coatings may comprise transparent conductive coatings. The conductive coatings 705 may comprise a metal oxide, such as indium tin oxide. Any suitable materials may be used for the conductive coatings, depending on the application. Further disposed over the two conductive coatings 705 may be two layers 706 that comprise the material of the aforementioned substrate 604. Although FIG. 7 shows the layers 706 comprise a glass, the material of these layers 706 need not be a glass. For example, the material may comprise a glass, an optical plastic, and the like. Any of the layers may have any suitable thickness, depending on the application.

Method of Making

The apparatuses described herein may be fabricated by any suitable method, depending on the application and material chemistry. The fabrication method may, for example, be similar to (or in some instances the same as) techniques of fabricating surface relief gratings. In one embodiment, the technique may be similar to (or in some instances the same as) those used to fabricate integrated circuit on wafers. For example, the fabrication may involve generally creating surface relief gratings by etching into a glass-like material of refractive index material and then filling in that etched pattern, and/or even over-coating the structure, with a material of a different refractive index.

In one embodiment, a diffractive element is fabricated similarly to a surface relief gratings structure: depositing photoresist onto a suitable substrate (a wafer of glass, for example), recording the interference pattern of two coherent beams into the photoresist, developing the resist into a grating mask, etching the exposed substrate through the mask, and stripping the mask. Additional evaporative coatings optionally may then be applied to enhance performance. However, in this embodiment, the fabrication is identical to producing one layer of an integrated circuit and may be run in existing foundries.

Another embodiment herein provides a method of making a diffractive element, comprising: disposing a photoresist over a first portion of a substrate, the substrate comprising an inorganic material having a first refractive index; developing the photoresist into a grating mask by recording an interference pattern of two coherent beams into the photoresist; etching a second portion of the substrate not covered by the gratings mask to create at least one valley in the substrate; filling at least partially the at least one valley with a filler material having a second refractive index that is unequal to the first refractive index; and removing the gratings mask from the substrate, thereby forming the diffractive element in one layer of an optical substrate. One exemplary result of the method in this embodiment may be the apparatus shown in FIG. 6A.

Another embodiment herein provides a method of making a diffractive element, comprising: disposing a photoresist over a first portion of a substrate, the substrate comprising an inorganic material having a first refractive index; developing the photoresist into a grating mask by recording an interference pattern of two coherent beams into the photoresist; etching a second portion of the substrate not covered by the gratings mask to create at least one valley in the substrate; removing the gratings mask from the substrate; and filling at least partially the at least one valley with a liquid crystal filler material having a second refractive index that is unequal to the first refractive index, thereby forming the diffractive element in one layer of an optical substrate. The method may further include the processes of disposing a conductive coating over the diffractive element. The conductive coating may be any of the conductive coating described above. Additionally, the method may further including the processes of disposing a material over the conductive layers, and the material may comprise a glass, a metal oxide, and the like. One exemplary result of the method in this embodiment may be the apparatus shown in FIG. 7.

The methods described herein may include further processes of replicating the gratings. The replication of the gratings may be a part of the method of making an apparatus containing the diffractive elements described herein. Alternatively, the replication of the gratings may be a separate process from the method of making the apparatus. The replication process may comprise forming a sub-substrate structure into a substrate. The sub-substrate structure may comprise a periodic structure. Alternatively, the sub-substrate structure may comprise a plurality of structures separated from one another by a plurality of valleys. The forming process may include stamping, molding, casting, or other suitable forming techniques. The forming process may involve using a master grating. The substrate may comprise any suitable materials, such as those described above, and may have a first refractive index. In one embodiment, the substrate comprises a plastic material, such as a transparent plastic. The forming process may be followed by filling at least partially the at least one valley of the periodic structure with a filler material having a second refractive index to thereby form a diffractive element in one layer of a substrate. The second index may be unequal to the first refractive index. As described above, the second index may be higher or lower than the first refractive index.

The method may further comprise determining, and optionally and additionally optimizing, the etch depth and/or angle of the valleys to obtain the desired optical performance. The determination may be performed before the disposing step, or may be performed after the entire fabrication method is completed for one cycle so that the next cycle may be optimized. The determination and optimization may both be carried out using software that is commercially available or custom designed.

Figure 5:
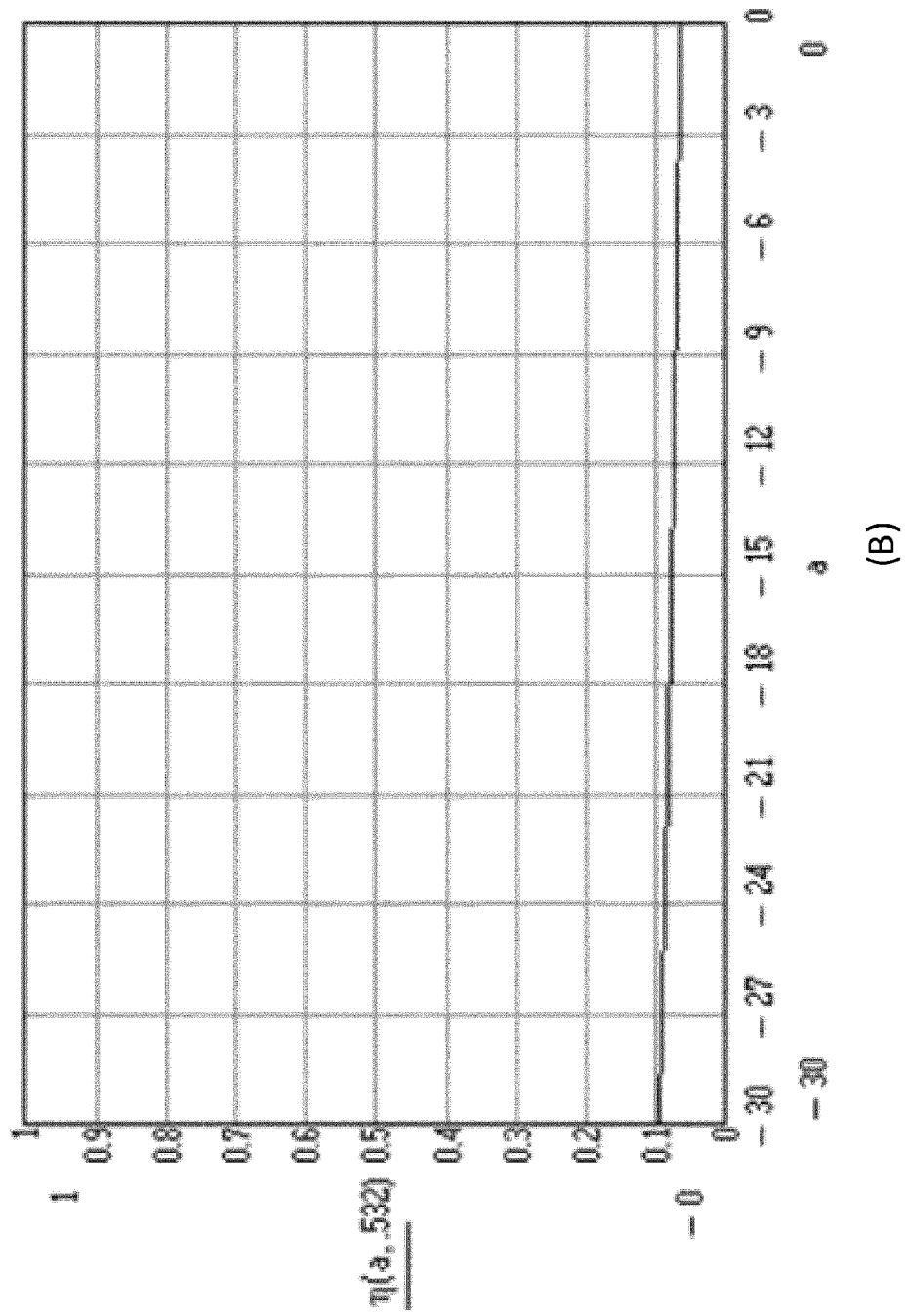
FIGS. 5A-5B show surface relief gratings in one exemplary embodiment: (A) shows a schematic of a surface relief grating; and (B) shows efficiency vs. field of the surface relief grating.
Figure 6:
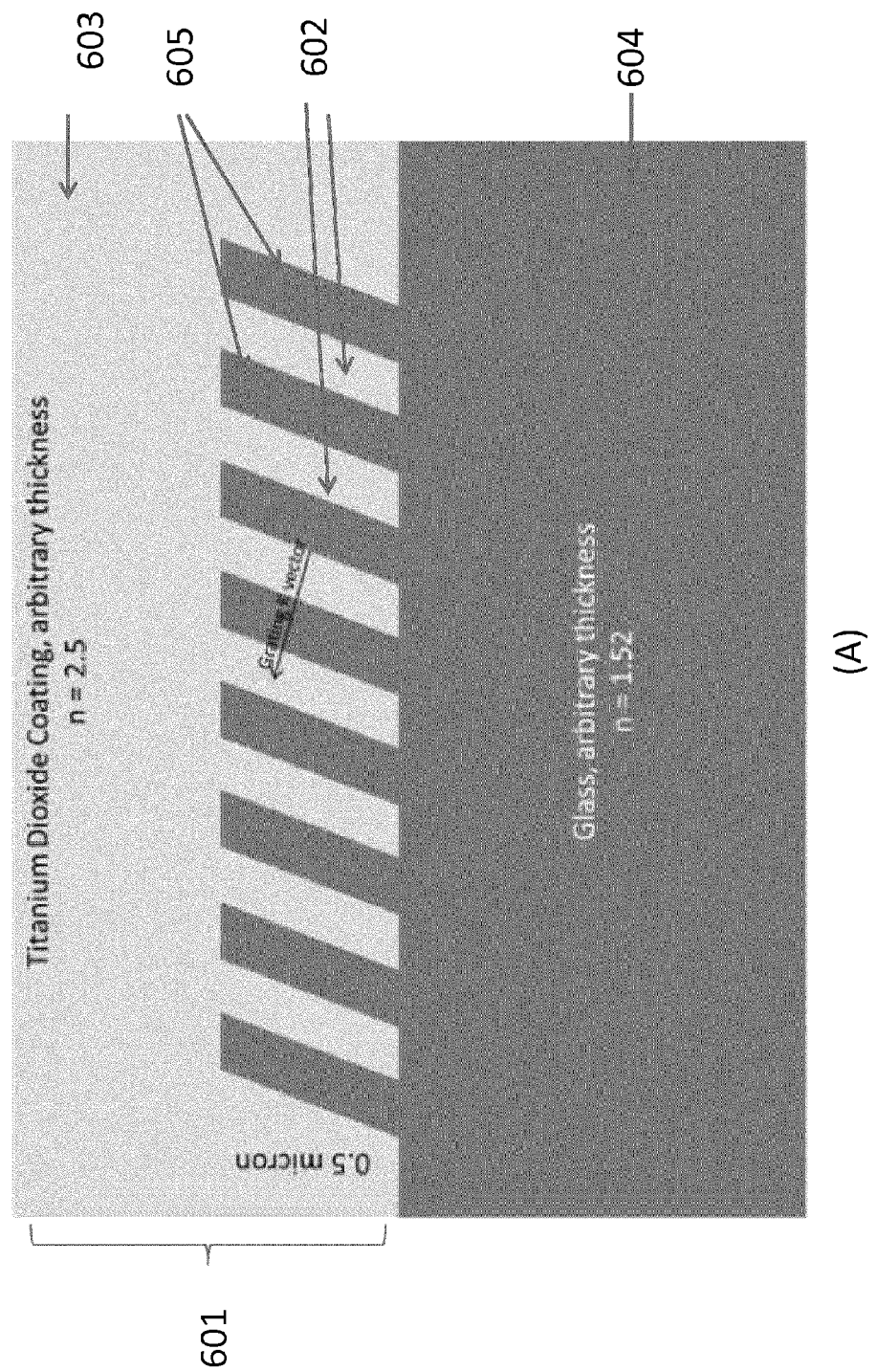
FIGS. 6A-6B illustrate an etched grating in one exemplary embodiment: (A) shows a schematic of an etched grating with rotated angle and high index coating; and (B) illustrates the etched gratings analyzed using the computer software Grating Solver.
Figure 6:
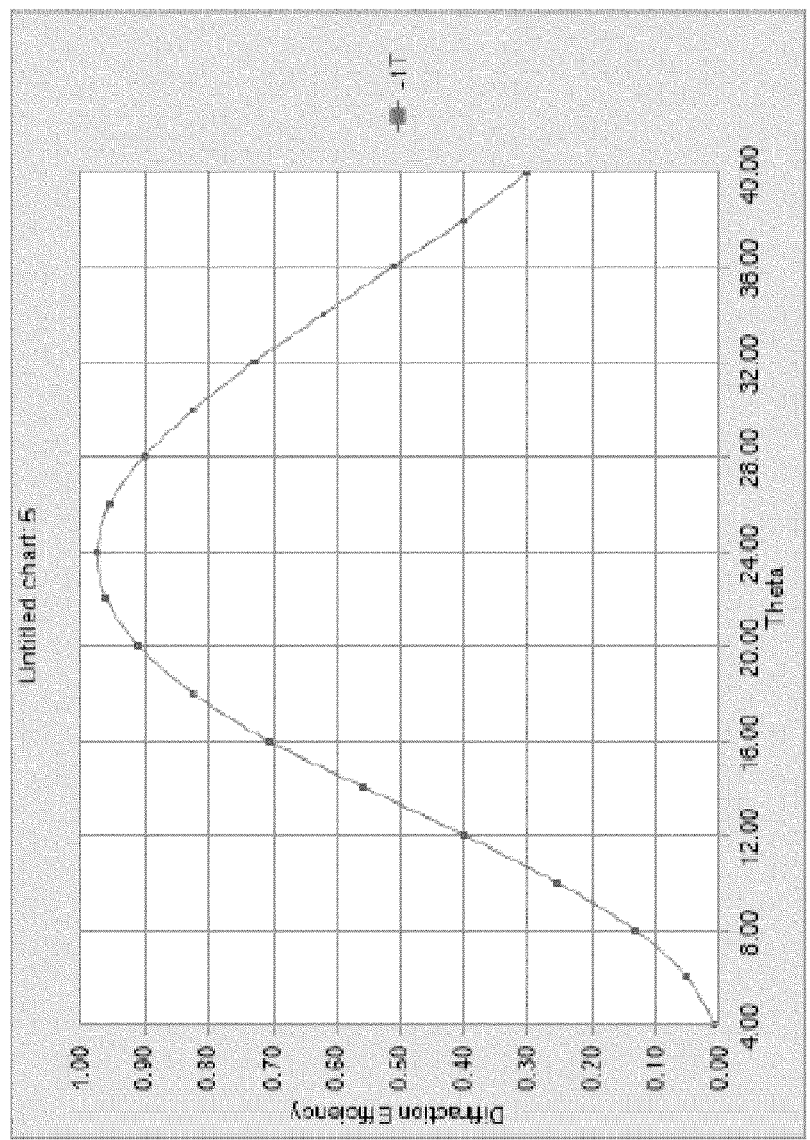

The fabrication in one embodiment is further illustrated by contrasting a pre-existing structure of FIG. 5 with the embodiment as shown in FIG. 6. The efficiency vs. field of view for the grating shown in FIG. 6 are designed to avoid the limitation of having gratings exposed to air (where the index modulation is the average difference between glass and air (0.26) and needing special protection of the gratings from handling). Instead, the gratings in FIG. 6 are designed by assuming the etch depth could go to 0.5 microns, only about 3 times deeper than the etched gratings in FIG. 5, and then coating the gratings with a very high refractive index material, such as titania ($TiO_2$)—a common optical coating material with refractive index of about 2.5. This coating material is also known as the filler material in some embodiments herein. This method produces an index modulation of 0.49, which is twice that of the uncoated surface relief grating. This method also raises the average index of the grating, which prevents rapid drop-off in performance near the critical angle. Furthermore, by coating (and further filling) the gratings with hard $TiO_2$ the gratings valleys are filled completely, providing protection from fingerprints and scratches. If desired, a cover glass may be cemented on top of the $TiO_2$ layer to increase optical thickness of the waveguide or produce other desirable effects.

The valleys may be etched at an angle to produce a desirable rotated k-vector that is commonly observed in a volume phase holography. In other words, the fabrication methods described herein allow fabrication of a surface-based structure, as opposed to a volume phase holography, while obtaining the functionality and properties of a volume phase holography without its drawbacks, such as haze. In particular, because the diffractive elements described herein employ glass that is homogenous and without dispersed liquid droplets, as in the case of HPDLC, the diffractive elements described herein may avoid the drawback of haze. In one embodiment, the k-vector may be made to change direction gradually across the waveguide to produce a more uniform field of view illumination. Furthermore, the etch depth may be made to vary gradually across the surface of the apparatus (e.g., waveguide) to produce more uniform eyebox illumination. The etching may be controlled to create different etch depth across the apparatus. For example, the input and output of the apparatus may have different etched depths, thus resulting in a tapered efficiency.

An embodiment of the diffractive element with angled valleys (or corollary with the slanted sub-substrate structures) is illustrated in a computer simulation construct as shown in FIG. 6A. In FIG. 6A, the coating 601 is disposed on a substrate, and the coating comprises a plurality of sub-substrate structures 602 and filler material 603 that fills the valleys between the sub-substrate structures 602 and the remainder spaces of the coating 601. The efficiency results based on the simulation of the construct in FIG. 6A is shown in FIG. 6B. The coating in FIG. 6A has been analyzed using Grating Solver (using rigorous coupled wave theory) and is shown to produce results very similar to Kogelnik theory (FIG. 4)—this is important because the refractive index modulates as a step function, not as a sine function.

Additional Notes

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention may be implemented in any of numerous ways. For example, some embodiments may be implemented using hardware, software or a combination thereof. When any aspect of an embodiment is implemented at least in part in software, the software code may be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media may be transportable, such that the program or programs stored thereon may be loaded onto one or more different computers or other processors to implement various aspects of the present technology as discussed above.

The terms "program" or "software" are used herein in a generic sense to refer to any type of computer code or set of computer-executable instructions that may be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. An apparatus, comprising:
   an optical substrate configured to manipulate light received from a light source; and
   at least one diffractive element in one layer in the optical substrate, each diffractive element being a volume phase grating, and comprising:
      a plurality of sub-substrate structures separated from one another by a plurality of valleys, the sub-substrate structures comprising a material having a first refractive index; and
      a filler material filling at least partially at least some of the plurality of valleys, the filler material having a second refractive index that is unequal to the first refractive index,
   wherein the at least one diffractive element has an index modulation value of at least about 0.3,
   wherein each of the plurality of valleys has a depth of between about 0.5 and 2.0 microns, the depth being from a top to a bottom of the sub-substrate structures, wherein the material of first refractive index comprises at least one of a glass, optical polymer, and a metal oxide.

2. The apparatus of claim 1, wherein the at least one diffractive element does not comprise a holographic polymer dispersed liquid crystal.

3. The apparatus of claim 1, wherein the filler material of second refractive index comprises at least one of titania, optical polymer, and a liquid crystal.

4. The apparatus of claim 1, wherein the filler material completely fills at least some of the plurality of valleys.

5. The apparatus of claim 1, wherein the plurality of sub-substrate structures is positioned at an angle deviating from a normal of a surface of the layer, and wherein each of the plurality of sub-substrate structures has a top face and two side faces.

6. The apparatus of claim 1, further comprising:
a first conductive coating disposed on the optical substrate, the at least one diffractive element disposed on the first conductive coating; and
a second conductive coating disposed on the at least one diffractive element such that the at least one diffractive element is sandwiched between the first conductive coating and the second conductive coating.

7. The apparatus of claim 1, wherein the at least one diffractive element has an index modulation value of at least about 0.4.

8. An apparatus, comprising:
an optical substrate configured to manipulate light received from a light source; and
at least one diffractive element in one layer in the optical substrate, each diffractive element being a volume phase grating, and comprising:
a plurality of sub-substrate structures separated from one another by a plurality of valleys, the sub-substrate structures comprising a material having a first refractive index; and
a filler material filling at least partially at least some of the plurality of valleys, the filler material having a second refractive index that is unequal to the first refractive index;
wherein the at least one diffractive element does not comprise a holographic polymer dispersed liquid crystal,
wherein the at least one diffractive element has an index modulation value of at least about 0.3,
wherein each of the plurality of valleys has a depth of between about 0.5 and 2.0 microns, the depth being from a top to a bottom of the sub-substrate structures,
wherein the material of first refractive index comprises at least one of a glass, optical polymer, and a metal oxide.

9. The apparatus of claim 8, wherein the sub-substrate structures are positioned at an angle with respect to a normal of a surface of the layer, and wherein each of sub-substrate structures has a top face and two side faces.

10. The apparatus of claim 8, wherein the diffractive element has a k-vector that varies along the respective direction of light manipulation.

11. The apparatus of claim 8, wherein the at least one diffractive element is switchable.

12. A device comprising the apparatus of claim 8, wherein the device is a part of at least one of HMD, HUD, and HDD.

13. The apparatus of claim 8, wherein the at least one diffractive element is not switchable.

14. The apparatus of claim 8, further comprising:
a first conductive coating disposed on the optical substrate, the at least one diffractive element disposed on the first conductive coating; and
a second conductive coating disposed on the at least one diffractive element such that the at least one diffractive element is sandwiched between the first conductive coating and the second conductive coating.

15. The apparatus of claim 8, wherein the at least one diffractive element has an index modulation value of at least about 0.4.

* * * * *